United States Patent
Øhrn

(10) Patent No.: US 11,445,148 B1
(45) Date of Patent: Sep. 13, 2022

(54) VIDEO TELECONFERENCE CURATED USER PROFILE PICTURE

(71) Applicant: Microsoft Technology Licensing, LLC, Redmond, WA (US)

(72) Inventor: Aleksander Øhrn, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/313,718

(22) Filed: May 6, 2021

(51) Int. Cl.
*H04N 7/15* (2006.01)
*G06T 7/11* (2017.01)
*G06V 40/16* (2022.01)

(52) U.S. Cl.
CPC ............. *H04N 7/15* (2013.01); *G06T 7/11* (2017.01); *G06V 40/166* (2022.01); *G06T 2207/20132* (2013.01)

(58) Field of Classification Search
CPC .......... H04N 7/15; H04N 7/147; H04N 7/142; H04L 65/403; G06K 9/00; G06T 7/11
USPC .......................................... 348/14.01–14.16
See application file for complete search history.

(56) References Cited

U.S. PATENT DOCUMENTS

| | | |
|---|---|---|
| 6,996,832 B2 | 2/2006 | Gunduc et al. |
| 7,162,426 B1 | 1/2007 | Schultz |
| 7,441,020 B2 | 10/2008 | Dideriksen et al. |
| 2002/0065568 A1 | 5/2002 | Silfvast et al. |
| 2006/0122814 A1 | 6/2006 | Beens et al. |
| 2010/0277563 A1* | 11/2010 | Gupta .................... H04N 7/142 348/14.08 |
| 2017/0017376 A1* | 1/2017 | Han ....................... G06F 9/453 |

(Continued)

FOREIGN PATENT DOCUMENTS

| | | |
|---|---|---|
| CN | 204143202 U | 2/2015 |
| EP | 3396618 A1 | 10/2018 |

(Continued)

OTHER PUBLICATIONS

JUCE 5.1: New DSP features, Retrieved from: https://juce.com/discover/stories/juce-5-1, Jul. 27, 2017, 9 Pages.

(Continued)

*Primary Examiner* — Melur Ramakrishnaiah
(74) *Attorney, Agent, or Firm* — Chin IP, PLLC

(57) ABSTRACT

Discrepancies between a current profile picture and a current visual appearance of the user is detected utilizing image data captured during a video teleconference, and potential updates to the user's profile picture are automatically generated and presented to the user for their consideration and selection. Additionally, for greater efficiency, an automated profile picture update process is triggerable by predetermined conditions or events, including hardware conditions, lighting or other environmental conditions, or events detected through other sensors, including concurrent audio analysis of the user during the video teleconference. A set of images, whether still pictures or live pictures, are obtained from the video information. Such an image set is initially filtered to create a smaller subset, which is then graphically modified. An image is selected and compared to an existing user profile image, with the comparison informing the generation of a user notification for choosing a new profile picture.

20 Claims, 5 Drawing Sheets

(56) References Cited

U.S. PATENT DOCUMENTS

| | | | |
|---|---|---|---|
| 2017/0286423 A1* | 10/2017 | Shorman | G06F 16/9535 |
| 2018/0060439 A1* | 3/2018 | Kula | G06F 16/9535 |
| 2019/0122030 A1 | 4/2019 | Raudies et al. | |
| 2019/0379750 A1* | 12/2019 | Zamora Duran | G06T 11/60 |
| 2021/0183021 A1* | 6/2021 | Benditte-Klepetko | |
| | | | G06T 5/005 |

FOREIGN PATENT DOCUMENTS

| | | |
|---|---|---|
| JP | 6536058 B2 | 7/2019 |
| WO | 03073725 A2 | 9/2003 |
| WO | 2016092383 A1 | 6/2016 |

OTHER PUBLICATIONS

"International Search Report and Written Opinion Issued in PCT Application No. PCT/US22/024140", dated Jul. 8, 2022, 14 Pages.

* cited by examiner

VIDEO TELECONFERENCE CURATED USER PROFILE PICTURE

BACKGROUND

A computer user profile is typically a collection of data that identifies a user of a computing device, a computing system, or of one or more application programs executing thereon. Typically, computer user profiles comprise information that is useful in identifying a user, including user's name, a unique identifier, or other like user-identifying information. Increasingly, computer user profiles include images, such as a picture of the user themselves, or pictures selected by the user that may be representative of the user, their interests, their families, or other like pictures that are of significance to the user. Often, information from a computer user profile can be utilized across multiple discrete application programs, operating systems, or combinations thereof. For example, an operating system user profile can provide information to individual applications executing on the operating system, including, for example, a user's name and a picture associated with the user profile. In such an example, the individual applications can present the user's name and the user's profile picture when, for example, displaying edits made by the user, when displaying files saved by the user, or when providing licensing information indicating that the application is licensed to the user. User profile information can also be shared among multiple computing devices. For example, a user setting up a tablet computing device can link the tablet computing device to an existing user account that is already linked to a mobile phone computing device. In such an example, user profile information, including a user profile picture, can be shared from the mobile phone computing device to the tablet computing device.

Increasingly, telecommunications comprising both audio and video data, commonly referred to as "video teleconferences", "videoconferences", and/or "video calls", are utilized to facilitate communication among two or more geographically separated users, thereby saving travel time and costs while affording the users many of the advantages typically associated with in-person meetings. Research indicates that the ability for a human user to visually perceive another human user is beneficial in establishing rapport, comfort and trust, as well as providing collaborative and communicational efficiency benefits. In some instances, however, a user participating in a videoconference may wish to deactivate their camera, or otherwise not display a concurrent video stream of such a user. In such instances, some videoconferencing software can display static images to attempt to facilitate at least some of the aforementioned benefits. Typically, such a static image is a user profile picture, or, if there is no profile picture associated with the user, some textual representation of the user, such as a user's name or initials. In addition to videoconferences where the user has not activated their camera, profile pictures are often utilized to identify users in other communicational contexts. For example, email applications, chat applications, instant message application and other like communicational applications often present, or provide an option to present, a user profile picture in identifying senders and/or recipients of the corresponding communications. Accordingly, an accurate profile picture, representing the user in both an accurate, as well as visually pleasing manner, can be beneficial. However, the obtaining, and subsequent setting, of such a profile picture can be tedious and time-consuming and is often not performed by many users. In such instances, unfortunately, the other users on the videoconference are presented with an image that may not be an accurate, and/or visually pleasing, representation of the user, and, accordingly, the users of the video teleconference do not derive the aforementioned benefits.

SUMMARY

Discrepancies between a current profile picture associated with the user and a current visual appearance of the user can be detected utilizing image data captured during a video teleconference, and potential updates to the user's profile picture can be automatically generated and presented to the user for their consideration and selection. Additionally, for greater efficiency, an automated profile picture update process can be triggered by predetermined conditions or events. Such predetermined conditions or events can include hardware conditions, lighting or other environmental conditions, or events detected through other sensors, including concurrent audio analysis of the user during the video teleconference. A set of images, whether still pictures or live pictures, can be obtained from the video information being captured and/or transmitted as part of the video teleconference. Such an image set can be initially filtered to create a smaller subset that can be more efficient to process, and can consume less processing and/or memory resources. Such filtering can include cropping to reduce the size of individual images, as well as pruning of the set of images to result a smaller subset, whether by selecting individual images for retention in the smaller subset, or by discarding other images from the original set to derive the smaller subset. The pruning can be based on colorimetric attributes of the images, facial feature positioning depicted in the images, or combinations thereof. The smaller subset can then have graphical modifications applied thereto, with such graphical modifications including, for example, modification of the background, colorimetric adjustments, such as contrast and/or saturation, skin tone smoothing, and other like graphical modifications. An image can be selected from the graphically modified filtered subset of images, with such a selection being based on a scoring of multiple images, including scoring based on colorimetric factors and facial feature positioning factors. The selected image can be compared to an existing user profile image, including by comparing individual pixels and/or groups of pixels, as well as by computing scores and then comparing the resulting scores. Such a comparison can then inform the generation of a user notification that can enable the user to set the selected image as their new user profile picture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
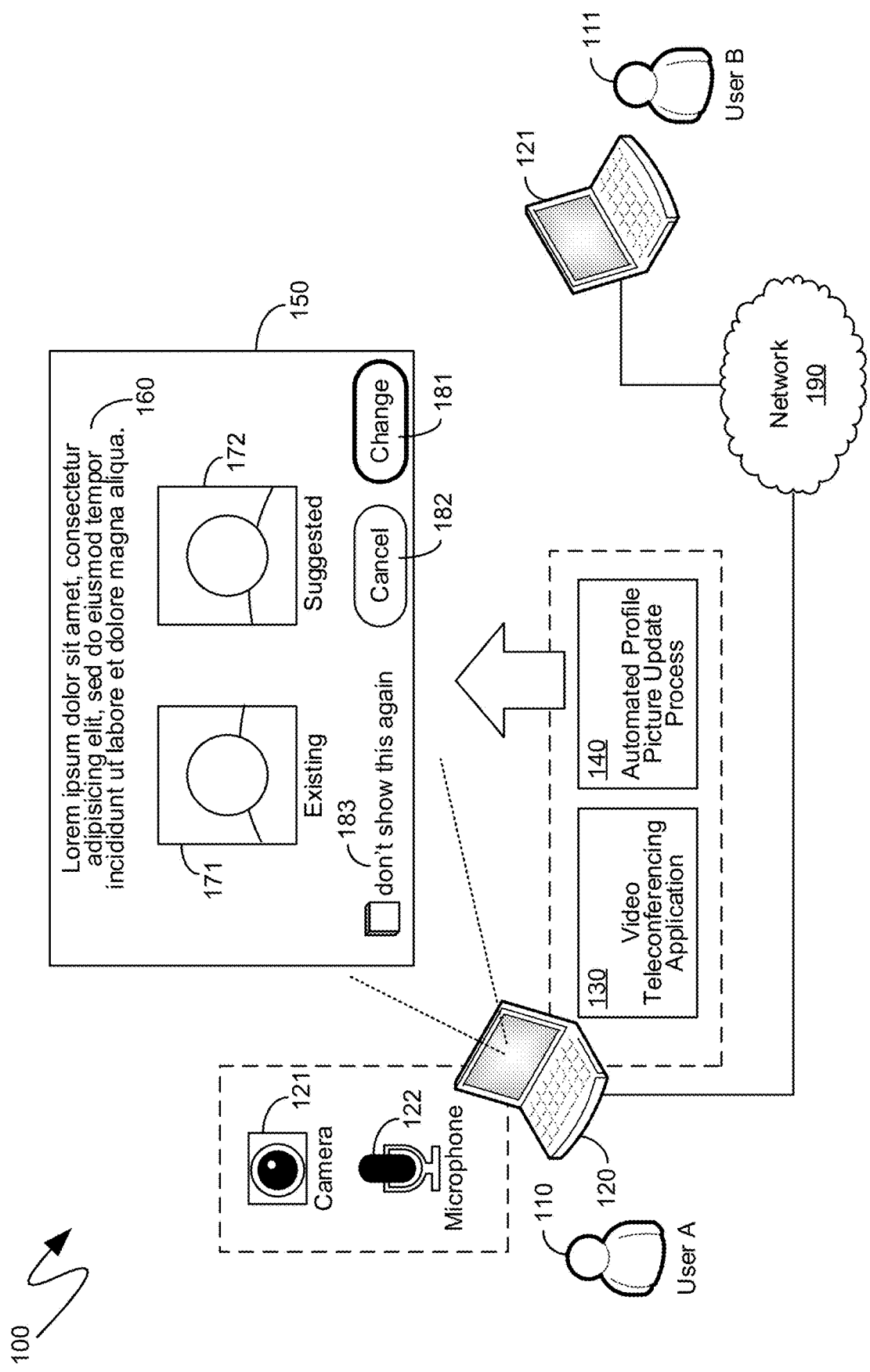
FIG. 1 is a system diagram of an exemplary system for the automated selection and user notification of potential user profile pictures curated from video teleconference data.

The following description relates to the automated selection and user notification of potential user profile pictures curated from video teleconference data. Discrepancies between a current profile picture associated with the user and a current visual appearance of the user can be detected utilizing image data captured during a video teleconference, and potential updates to the user's profile picture can be automatically generated and presented to the user for their consideration and selection. Additionally, for greater efficiency, an automated profile picture update process can be triggered by predetermined conditions or events. Such predetermined conditions or events can include hardware conditions, lighting or other environmental conditions, or events detected through other sensors, including concurrent audio analysis of the user during the video teleconference. A set of images, whether still pictures or live pictures, can be obtained from the video information being captured and/or transmitted as part of the video teleconference. Such an image set can be initially filtered to create a smaller subset that can be more efficient to process, and can consume less processing and/or memory resources. Such filtering can include cropping to reduce the size of individual images, as well as pruning of the set of images to result a smaller subset, whether by selecting individual images for retention in the smaller subset, or by discarding other images from the original set to derive the smaller subset. The pruning can be based on colorimetric attributes of the images, facial feature positioning depicted in the images, or combinations thereof. The smaller subset can then have graphical modifications applied thereto, with such graphical modifications including, for example, modification of the background, colorimetric adjustments, such as contrast and/or saturation, skin tone smoothing, and other like graphical modifications. An image can be selected from the graphically modified filtered subset of images, with such a selection being based on a scoring of multiple images, including scoring based on colorimetric factors and facial feature positioning factors. The selected image can be compared to an existing user profile image, including by comparing individual pixels and/or groups of pixels, as well as by computing scores and then comparing the resulting scores. Such a comparison can then inform the generation of a user notification that can enable the user to set the selected image as their new user profile picture.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. In the exemplary system 100, one user, such as the exemplary user 110, is illustrated as engaging in a video teleconference with another user, such as the exemplary user 111. More specifically, and as illustrated by the exemplary system of FIG. 1, the exemplary user 110 utilizes a computing device, such as the exemplary computing device 120, to execute a video teleconferencing application, such as the exemplary video teleconferencing application 130. The exemplary video teleconferencing application 130 can then obtain audio information from the user 110, such as by utilizing a microphone, such as the exemplary microphone 122, which is communicationally coupled to the computing device 120, to capture audio from the user 110. The audio is digitized, or otherwise transcoded into a digital form, such as by the video teleconferencing application 130, either on its own or through the utilization of other computer-executable instructions executing on the exemplary computing device 120. The digital audio data can then be communicated across a network to which the computing device 120 is communicationally coupled, such as the exemplary data network 190, to a receiving computing device, such as the exemplary computing device 121. A corresponding video teleconferencing application executing on the exemplary computing device 121 can then decode the audio data and play it for the user 111, such as through a speaker of the exemplary computing device 121.

In a similar manner, video data can be transmitted from the computing device 120 to the computing device 121 via the network 190. More specifically, video information captured by a video camera communicationally coupled to the exemplary computing device 120, such as the exemplary video camera 121, can be digitized, or otherwise transcoded into a digital form, such as by the video teleconferencing application 130, either on its own or through the utilization of other computer-executable instructions executing on the exemplary computing device 120. The digital video data can then be communicated across the network 190 to the exemplary computing device 121, where a corresponding video teleconferencing application executing on the computing device 121 can decode the video data and display it for the user 111, such as on a display device of the exemplary computing device 121.

According to one aspect, an automated profile picture update process, such as the exemplary automated profile picture update process 140, can also execute on the exemplary computing device 120, either as a component, plug-in, or other like extension of the video teleconferencing application 130, or as a separate process executing in its own process space. The exemplary automated profile picture update process 140 can obtain image data from the video teleconferencing application 130 and can utilize such image data to detect differences between the user 110, as visually represented within the image data from the video teleconferencing application 130, and a current profile picture associated with the user 110. Furthermore, depending upon the detected differences, the exemplary automated profile picture update process 140 can further provide the user 110 with the option of changing the profile picture currently associated with the user 110 to a new profile picture generated and suggested by the automated profile picture update process 140.

For example, the automated profile picture update process 140 can generate graphical user interface elements, such as the exemplary graphical user interface element 150, shown in FIG. 1. Depending upon detected differences between an image selected by the automated profile picture update process 140 as a suggested profile picture, such as the selected image represented by the suggested profile picture 172, and a current profile picture, such as the exemplary existing profile picture 171, the exemplary graphical user interface element 150 can comprise a textual description, such as the exemplary textual description 160, providing the user 110 with relevant information. For example, if the automated profile picture update process 140 detects differences between a current appearance of the user 110 and the appearance of the user 110 in the existing profile picture 171, the exemplary textual description 160 can notify the user that their appearance has changed, and can suggest an updated profile picture, such as the exemplary suggested profile picture 172. The detected difference can be explicitly enumerated in the exemplary textural description 160. For example, the exemplary textual description 160 can comprise a notification in the form of: "It looks like your hair color has changed. Would you like to update your profile picture?" or "It looks like you've grown a beard. Would you like to update your profile picture?" As an alternative, a more generic notification can be provided. for example, the exemplary textual description 160 can comprise a notification in the form of: "Your profile picture does not appear to look like you. Would you like to update your profile picture?"

As another example, the automated profile picture update process 140 can obtain additional information associated with the user's current profile picture, or can be explicitly triggered to execute by information associated with the user's current profile picture, such as information indicative of the user's current profile picture being older than a profile image age threshold. For example, the profile image each threshold can be set to one year, and the user's current profile picture can have been set more than a year ago, and can have remained unchanged since then. In such an example, the exemplary textual description 160 can inform the user of the detected aspect, or of the reason for which execution of the automated profile picture update process 140 was triggered. For example, the exemplary textual description 160 can comprise a notification in the form of: "You haven't changed your profile picture in over a year. Would you like to update your profile picture?"

As yet another example, the presentation of the exemplary graphical user interface element 150 can be contingent upon the automated profile picture update process 140 determining that a profile picture it has generated from the image data obtained from the video teleconferencing application 130, such as the exemplary suggested profile picture 172, is a better profile picture than the existing profile picture associated with the user 110, such as the exemplary existing profile picture 171. In such an instance, as part of the generation of the exemplary graphical user interface element 150, the automated profile picture update process 140 can generate an exemplary textual description 160 that simply asks the user 110 if they would like to change their profile picture. For example, the exemplary textual description 160 can comprise a notification in the form of: "Would you like to update your profile picture?"

According to one aspect, the presentation of the graphical user interface element 150 can be timed so as to facilitate the user's interaction therewith, and otherwise minimize disruption to the user. For example, the automated profile picture update process 140 can present the graphical user interface element 150 at the start of a subsequent video teleconference in which the user 110 has not activated the camera 121 such that the existing user profile picture 171 is being presented to other users participating in that subsequent video teleconference. As another example, the automated profile picture update process 140 can present the graphical user interface element 150 at the end of a video teleconference from which the automated profile picture update process 140 generated the suggested profile picture 172. As yet another example, the automated profile picture update process 140 can present the graphical user interface element 150 when the user 110 sends an email, or otherwise generates a communication that can include the user's profile picture. The timing of the presentation of the graphical user interface element 150 can, therefore, be selected such that the user, at the time of the presentation, can appreciate an immediate reason and/or benefit to updating their profile picture.

According to one aspect, the response provided by the user 110 to the display of the exemplary graphical user interface element 150 can modify aspects of the operation of the automated profile picture update process 140. For example, if the user selects the "don't show this again" option 183, or otherwise indicates that the user does not desire suggested updates to their profile picture, execution of the automated profile picture update process 140 can be deactivated and can remain in a non-executing state until a future time when the user may explicitly request execution of the automated profile picture update process 140, or otherwise modifies a do not execute option that can be established by the user selection of the option 183.

As another example, if the user selects an option to not accept the suggested profile picture 172, such as, for example, by selecting the exemplary cancel option 182, various thresholds utilized in the selection of the suggested profile picture 172 can be increased, decreased or otherwise changed. For example, if the presentation of the exemplary graphical user interface element 150 was triggered by a determination that the suggested profile picture 172 is an improvement over the existing profile picture 171, but the user selects the cancel option 182, then the delta, between a profile picture selected by the automated profile picture update process 140 and the user's current profile picture, necessary to trigger a subsequent presentation of the graphical user interface element 150, will be increased. The user's selection, therefore, can be utilized in a reinforcement learning paradigm to adjust various threshold values, such as the aforementioned delta, to derive optimal, or user-optimized, values.

As will be detailed further below, one mechanism by which a profile picture selected by the automated profile picture update process 140 can be compared to a user's current profile picture can be the computation of a score for each image. A user notification, such as the exemplary graphical user interface 150, can then be triggered if the profile picture selected by the automated profile picture update process 140 has a higher score than the user's current profile picture, and the difference between the two scores is more than a notification threshold. For example, if the automated profile picture update process 140 determines that the profile picture selected by the automated profile picture update process 140 has a score of eighty-eight, and further determines that the user's current profile picture has a score of eighty, then the exemplary graphical user interface 150 can be presented if the notification threshold is eight or less. Conversely, if the notification threshold is, for example, ten, then the score assigned to the profile picture selected by the automated profile picture update process 140 is not sufficiently greater than the score assigned to the user's current profile picture, and no user notification can be triggered. Accordingly, if the user selects the cancel option 182, then the notification threshold can be increased such that a future notification will be generated if a profile picture that is subsequently selected by the automated profile picture update process 140 as an even higher score, such that the difference between the score assigned to such a subsequently selected profile picture, and the user's current profile picture, will be even greater.

Alternatively, or in addition, user selection of the cancel option 182 can change the metrics or attributes on which the score is generated. As will be detailed further below, profile pictures can be scored based on colorimetric attributes, facial feature positioning attributes, and other like attributes. As utilized herein, the term "colorimetric attributes" means computable or detectable aspects of an image that quantify a human's visual perception of the image. Accordingly, the term "colorimetric attributes" means contrast, brightness, exposure, brilliance, white point, black point, and other like computed values that quantify a human's visual perception of the image as a whole, or of discrete portions of the image. As utilized herein, the term "facial feature positioning attributes" means computable or detectable aspects of positions of individual facial features, most notably the user's eyes, mouth and eyebrows, including whether, and how much, the user's eyes and mouth are open and/or closed, and the shape, or other position, of the user's eyes, mouth and eyebrows.

For example, if a score of both the suggested profile picture 172 and the existing profile picture 171 were calculated based on computed exposure values for both profile pictures, and the user selected the cancel option 182, subsequent scoring of pictures can be based on other colorimetric attributes, or can weight exposure values less highly. Conversely, if the user selected the change option 181, subsequent scoring of pictures can weight exposure values more highly.

As another example, and as indicated previously, a user can be prompted to change their profile picture if the current profile picture is older than a profile image age threshold. For example, if the profile image age threshold is one year, and the user has not changed their profile picture in over a year, then the automated profile picture update process 140 can select a suggested profile picture 172 and present it to the user, such as via the graphical user interface element 150. In such an instance, if the user selects the cancel option 182, then the profile image age threshold can be increased. For example, the image age threshold can be increased to eighteen months from a prior setting of one year. In a similar manner, other thresholds that trigger, or otherwise inform, the execution of the automated profile picture update process 140, or the determination to notify the user of a suggested profile picture 172, can be increased, decreased, or otherwise changed.

Conversely, if a user selects the change option 181, in addition to changing the user's profile picture to the suggested profile picture 172, other aspects of the operation of the automated profile picture update process 140 can also be modified. For example, and as indicated previously, the attributes on which the pictures were scored can be changed or reweighted.

As another example, and as will be detailed further below, the automated profile picture update process 140 can apply graphical modifications to images obtained from the video teleconferencing application 130 as part of the generating of the suggested profile picture 172. A user selection of the change option 181 can cause a graphical modification applied to generate the suggested profile picture 172 to be increased in importance, desirability, or other like metric. Conversely, a user selection of the cancel option 182 can cause the graphical modification applied to generate the suggested profile picture 172 to have a corresponding metric decreased. Such metrics can be maintained on an individual user basis, or they can be anonymously shared such that the application of future graphical modifications will be informed, not only by a specific user's selections, but by the selections of a community of users. The weighting applied to colorimetric attributes, facial feature positioning attributes, and other like attributes on which pictures are scored, and/or the decision whether to include or exclude such attributes in the first place in the determination of picture scores, can likewise be informed not only by a specific user's selections, but by the selections of a community of users.

Figure 2:
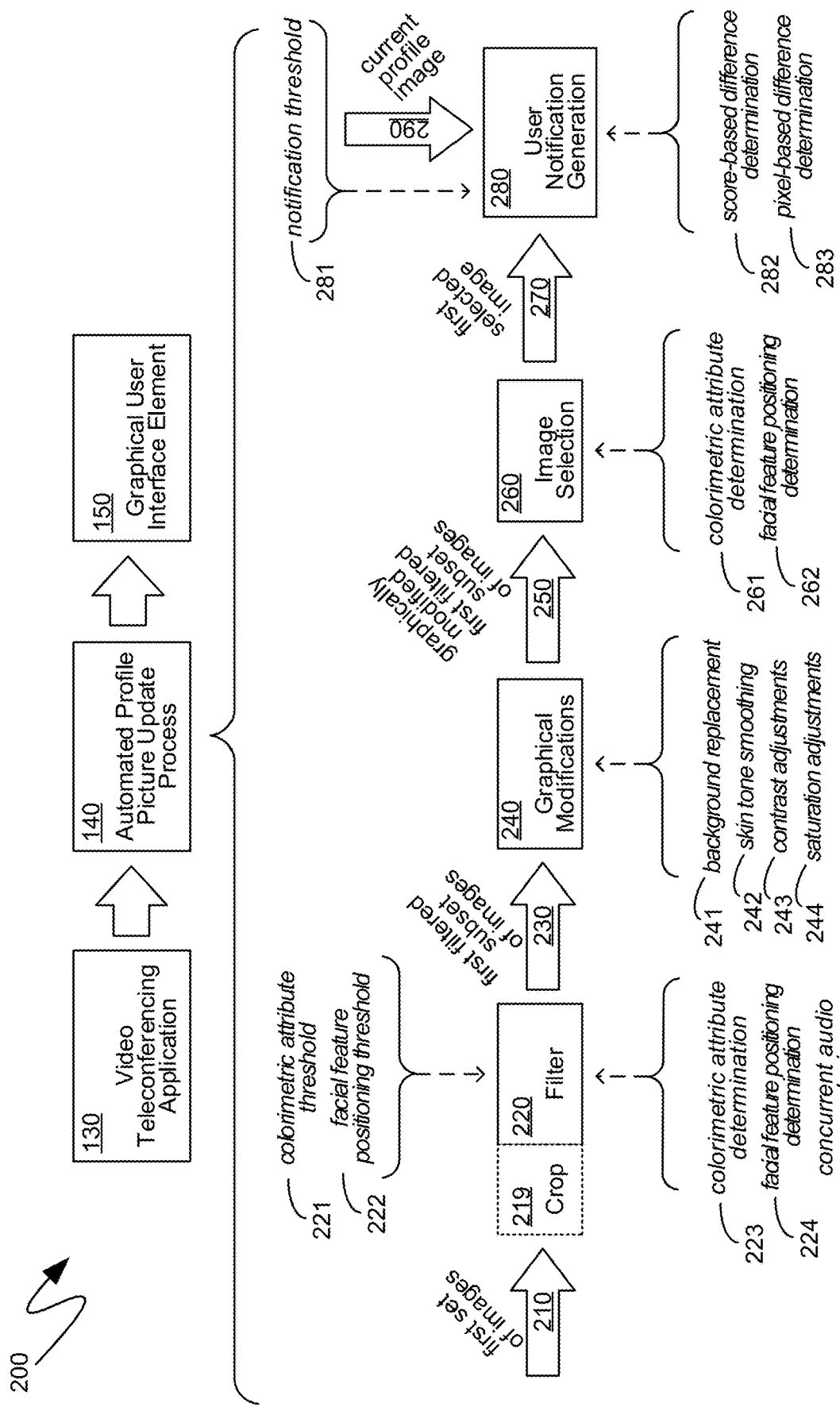
FIG. 2 is a system diagram of an exemplary automated profile picture updating process.

Turning to FIG. 2, the exemplary system 200 shown therein illustrates exemplary aspects of the automated profile picture update process 140. More specifically, and as generally illustrated at the top of FIG. 2, the automated profile picture update process 140 can obtain audio data, video data and other information from the video teleconferencing application 130, and can, in turn, if appropriate, generate a graphical user interface element 150 that can notify the user of detected negative aspects of the profile picture currently associated with the user, and can suggest a new profile picture that is generated from the video data obtained from the teleconferencing application 130. An exemplary operation of the automated profile picture update process 140 is illustrated in the system 200 of FIG. 2 with reference to the subcomponents 219, 220, 240, 260 and 280.

Initially, a first set of images can be obtained from the video teleconferencing application 130, such as the exemplary for set of images 210 shown in the system 200 of FIG. 2. According to one aspect, the first set of images 210 can be discrete frames of the video being recorded and transmitted by the video teleconferencing application 130. Accordingly, the video teleconferencing application 130 can be leveraged to decode a video stream to regenerate the first set of images 210, or the first set of images 210 can be obtained prior to their encoding into a video format by the video teleconferencing application 130. According to another aspect, components of a host operating system can be utilized to obtain the first set of images 210 from a video teleconferencing application 130 that is otherwise agnostic to the execution of the automated profile picture update process 140 in that it provides no explicit interfaces or other like mechanisms by which the automated profile picture update process 140 can directly obtain the first set of images 210 from the video teleconferencing application 130. For example, the components of the host operating system can enable screen captures, data stream intercepts, or other like mechanisms by which the automated profile picture update process 140 can obtain the first set of images 210 from video data being obtained and/or transmitted by the video teleconferencing application 130.

As utilized herein, the term "images" means both static images representing a singular point in time and appearing to display no movement when viewed by a human user, as well as live images which represent a duration in time, typically a very short duration in time, such as one or two seconds, and appear to display movement when presented to, and viewed by, a human user. Additionally, the term "picture" is utilized herein synonymously with the term "image", and, as such, the term "picture" means both static pictures and live pictures.

Turning back to FIG. 2, once the automated profile picture update process 140 has obtained the first set of images 210, a filter component, such as the exemplary filter component 220 can perform an initial filtering to facilitate the process of ultimately selecting a suggested profile picture. According to one aspect, to minimize computational and memory storage resources, the images of the first set of images 210 can first be cropped by a crop component, such as the exemplary crop component 219. By removing pixels from the periphery of each image in the first set of images 210, the size of the individual images of the first set of images 210 can be reduced, thereby reducing both memory storage utilization, as well as reducing the amount of computation performed by the subsequent components, since the quantity of image data for each image is less.

In performing the cropping, the exemplary crop component 219 can take advantage of traits of the first set of images 210 that can be unique or endemic to video teleconferencing. For example, a user typically centers themselves within the frame of the video camera when participating in a video teleconference. Accordingly, the crop component 219 can, according to one aspect, simply remove an equal depth of pixels from each edge of each image in the first set of images 210, essentially assuming that the relevant aspect of the image, namely the user, is centered within the image. According to another aspect, the crop component 219 can incorporate facial detection technology, which can search for facial patterns within the first set of images 210, such as the common arrangement of eyes, a nose and a mouth on a human face. While existing facial detection mechanisms can be utilized, the exemplary crop component 219 can, again, take advantage of traits that are unique or endemic to video teleconferencing, such as the anticipated self-centering of the user within an image frame, and can improve the efficiency of the facial detection mechanisms utilized by, for example, starting the facial detection mechanisms at a center of the image frame, and proceeding outward circumferentially.

The exemplary crop component 219 is illustrated with dashed lines to indicate that, according to other aspects, the first set of images 210 can be provided directly to the filter component 220. The filter component 220 can filter the first set of images 210, whether cropped or full frame, to generate the first filtered subset of images 230, retaining only some images, namely a subset of images, from the first set of images 210. The filter component 220 can select images to be discarded, or otherwise removed from the first set of images 210, to thereby indirectly generate the first filtered subset of images 230 with the images that remain unremoved, can select images specifically for inclusion in the first filtered subset of images 230, or combinations thereof.

According to one aspect, the selection of images, whether for inclusion or removal, can be based on a colorimetric attribute determination, such as the exemplary colorimetric attribute determination 223. As defined previously, the term "colorimetric attributes" means computable or detectable aspects of an image that quantify a human's visual perception of the image. As such, the exemplary colorimetric attribute determination 223 includes, for example, the determination of an image's contrast, brightness, exposure, brilliance, white point, black point, and other like computed values that quantify a human's visual perception of the image as a whole, or of discrete portions of the image. The exemplary filter component 220 can utilize any one of these colorimetric attributes to select an image for removal from the first set of images 210 or, conversely, to select an image for inclusion in the first filtered subset of images 230. Alternatively, or in addition, the exemplary filter component 220 can utilize multiple of these colorimetric attributes in combination to select an image for removal from the first set of images 210 or to select an image for inclusion in the first filtered subset of images 230. For example, images, from the first set of images 210, that the filter component 220, utilizing an aspect of the colorimetric attribute determination 223, determines have a white point that is too yellow can be discarded from the first set of images 210. In performing such a determination, the filter component 220 can reference one or more colorimetric attribute thresholds, such as the exemplary colorimetric attribute threshold 221. For example, one colorimetric attribute threshold 221 can be a threshold white point value such that white points that are further from the reference white point than the threshold white point value will result in the corresponding image being discarded from the first set of images 210 by the filter component 220. As another example, a colorimetric attribute threshold 221 can include a threshold brightness value, such that images having a brightness below the threshold brightness value, as determined by the colorimetric attribute determination 223, can be removed from the first set of images 210 by the filter component 220.

While the above examples have been provided within the context of the colorimetric attribute threshold 221 representing a threshold utilized to remove images, the colorimetric attribute threshold 221 can likewise represent a threshold utilized to retain images, or otherwise explicitly include images in the first filtered subset of images 230. Thus, for example, utilizing the colorimetric attribute determination 223, the filter component 220 can determine that an image has a brightness value that is greater than a relevant colorimetric attribute threshold 221, such as a threshold brightness value, and, as a consequence, the filter component 220 can explicitly include such an image in the first filtered subset of images 230. In some instances, even for the same colorimetric attribute determination 223, different colorimetric attribute thresholds 221 can be utilized depending on whether the filter 220 is utilizing an inclusion-centric or exclusion-centric approach to generating the first filtered subset of images 230. For example, two different colorimetric attribute thresholds 221 can be established for, for example, brightness values, with one threshold brightness value representing a minimum brightness value below which images will be explicitly discarded from the first set of images 210, while another represents a threshold brightness value above which images will be explicitly included in the first filtered subset of images 230. Depending on whether the operation of the filter component 220 operates by explicitly including images and the first filtered subset of images 230, or by removing images from the first set of images 210, which setting can be determined by other factors, different ones of the colorimetric attribute thresholds 221 can be utilized.

As indicated previously, the filter component 220 can filter images based on a combination of individual colorimetric attributes. For example, the colorimetric attribute determination 223 can include the determination of both brightness levels, as well as white points for a given image from the first set of images 210. The filter component 220 can include an image in the first filtered subset of images 230 if, for example, both: (1) the determined brightness level of the image is greater than a corresponding colorimetric attribute threshold 221, namely a minimum brightness level, as well as (2) the determined white point of the image is closer to a reference white point than a corresponding colorimetric attribute threshold 221, namely a threshold white point value. Other like combinations of individual colorimetric attributes can be utilized by the filter component 222 either exclude images from the first set of images 210, explicitly include images in the first filtered subset of images 230, or perform combinations thereof to generate the first filtered subset of images 230.

In addition to performing filtering based on colorimetric attributes, the filter component 220 can also generate the first filtered subset of images 230 from the first set of images 210 by utilizing user facial feature positioning determination, such as the exemplary user facial feature positioning determination 224. As defined previously, the term "facial feature positioning attributes" means computable or detectable aspects of positions of individual facial features, most notably the user's eyes, mouth and eyebrows, including whether, and how much, the user's eyes and mouth are open and/or closed, and the shape, or other position, of the user's eyes, mouth and eyebrows. As such, the user facial feature positioning determination includes analyzing an image to determine whether a user pictured in the image has their eyes opened or closed, has their mouth opened or closed, and other like user facial feature positioning determinations. For example, the user facial feature positioning determination 224 can enable the filter component 220 to determine that a human face shown in an image of the first set of images 210 has eyes that are closed. The filter component 220 can then remove such an image, or otherwise filter it out from the first filtered subset of images 230. Such filtering can again be performed with reference to thresholds, such as an exemplary user facial feature positioning threshold 222. For example, the user facial feature positioning determination 224 can analyze a human face in an image and generate a resulting value indicating, along a continuum, how open or closed the eyes of the analyzed human face are, with, for example, one value along the continuum representing fully closed eyes, and another value along the continuum representing fully open eyes, and values in between those two representing partially opened and partially closed eyes. In such an example, the user facial feature positioning threshold 222 can be a value that represents eyes that are sufficiently open, such that values below such a threshold are indicative of eyes that are not sufficiently open and will then be filtered out by the filter component 220.

As before, different user facial feature positioning thresholds 222 can be utilized for the explicit removal of images versus the explicit retention of images, depending on whether the filter component 220 is explicitly removing images from the first set of images 210 to generate the first filtered subset of images 230, or is explicitly selecting images from the first set of images 210 to be included in the first filtered subset of images 230. Additionally, the filter component 220 can filter the first set of images 210 based on combinations of colorimetric attribute determinations 223 and user facial feature positioning determinations 224. For example, the filter component 220 can remove images from the first set of images 210 based on the images both having a brightness below a corresponding colorimetric attribute threshold 221 in the form of a brightness threshold, and having eyes that are less open than a corresponding user facial feature positioning threshold 222.

According to one aspect, concurrent audio analysis, such as the exemplary concurrent audio analysis 225, can be utilized by the filter component 222 filter out images from the first set of images 210. More specifically, in addition to the first set of images 210 the automated profile picture update process 140 can also obtain audio data from the video teleconferencing application 130. Such audio data can be analyzed, such as by the filter component 220, to detect audio that may be indicative of images that should be retained in the first filtered subset of images 230, audio that may be indicative of images that should be filtered out of the first set of images 210, or combinations thereof. For example, audio data can be analyzed by the filter component 220 to detect coughing, sneezing, yawning and other like sounds. The filter component 220 can then remove images that are concurrent with such sounds, since such images are not likely to yield high-scoring profile pictures. As another example, audio data can be analyzed by the filter component 220, to detect laughter, or other like sounds indicating that a user is happy. The filter component 220 can then explicitly select, for inclusion in the first filtered subset of images 230, images that are concurrent with such sounds. Alternatively, or in addition, the concurrent audio analysis 225 can identify images that are offset in time. For example, images that occur for a few seconds prior to, or for a few seconds following, the time period during which the concurrent audio analysis 225 detects laughter.

In addition to, or as an alternative to, analyzing for specific sounds, such as laughter, sneezing, coughing, yawning and other like specific sounds, the concurrent audio analysis 225 can also analyze vocal tonality, speech patterns, such as stuttering, incomplete phrasing, or other like speech patterns, volume, vocal modulation, and other like vocal analysis that can be indicative of a speaker's mood. For example, the concurrent audio analysis 225 can identify an increase in volume, or other indicia of shouting and/or yelling. In such an example, the filter component 220 can filter out of the first set of images 210 images of the user concurrent with the time period during which the concurrent audio analysis 225 detected shouting and/or yelling. As another example, the concurrent audio analysis 225 can identify vocal modulation indicative of pleasantly excited speech, and the filter component 220 can explicitly retain, within the first filtered subset of images 230, images that are concurrent with the time period during which the concurrent audio analysis 225 has identified the aforementioned vocal modulation.

As yet another aspect, which, again, can be in addition to the above-described concurrent audio analysis, or can be an alternative form thereof, the concurrent audio analysis 225 can incorporate speech recognition, at least insofar as being able to recognize specific trigger words or phrases. For example, the concurrent audio analysis can identify specific portions of the video teleconference as comprising an introduction by the user, including an initial recitation of the user's name, occupation, company, group, or other like identifying information that can be a signal of an introduction. During such an introduction, the user may behave in such a manner that captured images will provide high scoring, or otherwise selected, suggested profile images. As indicated previously, the descriptions herein are equally applicable to live pictures and live images. In that context, identification, by the concurrent audio analysis 225, of an introduction can have the further benefit of facilitating a user profile with a live image of the user introducing themselves.

As before, the filter component 220 can utilize combinations of the various determinations, such as the colorimetric attribute determinations 223, the user facial feature positioning determinations 224, as well as the concurrent audio analysis 225, to perform the filtering of the first set of images 210. For example, the filter component 220 can include images in the first filtered subset of images 230 that meet all three criteria: (1) the concurrent audio analysis 225 having detected laughter a few seconds prior to when the images were taken, (2) the user facial feature positioning determination 224 determining a value for the positioning of the user's eyes that indicates they are more open than a corresponding user facial feature positioning threshold 222 and (3) the colorimetric attribute determination 223 determining a brightness value that is greater than the corresponding colorimetric attribute threshold 221, such as a minimum brightness value.

The first filtered subset of images 230, being a smaller set of images than the first set of images 210, can, optionally, have graphical modifications applied to the images contained therein, such as by a graphical modifications component, such as the exemplary graphical modifications component 240. According to one aspect, the graphical modifications component 240 can apply graphical modifications to some or all of the individual images of the first filtered subset of images 230 that improve a visual appearance of the images as perceived by human, and render the images more suitable for use as profile pictures. For example, a graphical modifications component 240 can include background replacement functionality 241. Such background replacement functionality can remove aspects of the background behind a user that is shown in the individual images of the first filtered subset of images 230 so as to render the images more suitable for use as a profile picture. For example, the background replacement functionality 241 can replace an existing background pictured in the individual images with a uniform-colored background. While the background replacement functionality 241 is shown as being utilized by the graphical modifications component 240, such functionality can be merely leveraged by the graphical modifications component 240 while being provided by an alternative source, such as the video teleconferencing application 130. More specifically, some video teleconferencing applications include background replacement functionality. Accordingly, the graphical modifications component 240 can access such background replacement functionality from the video teleconferencing application 130 and replace, or otherwise modify, the backgrounds of some or all of the images of the first filtered subset of images 230.

Additionally, the graphical modifications component 240 can include, or utilize, functionality that modifies the graphical aspects of an entire image, such as, for example, the saturation adjustments functionality 244, which can increase, or decrease, a color saturation of a whole image. As another example, the contrast adjustments functionality 243 can increase, or decrease, a determined image contrast, such as between different colors, or between lighter portions and darker portions of an image. According to one aspect, the application of such graphical adjustments, such as the saturation adjustments 244 and/or the contrast adjustments 243 can be triggered by the graphical modifications component 240 performing an analysis of one or more of the images of the first filtered subset of images in order to determine that such an image is a candidate for the saturation adjustments 244 and/or the contrast adjustments 243. For example, images having a contrast below a contrast threshold can have the contrast adjustments 243 applied by the graphical modifications component 240, while images having a contrast above such a contrast threshold can have no such graphical modification applied by the graphical modifications component 240. As another example, images having a contrast below a contrast threshold can have one level of contrast adjustments 243 applied by the graphical modifications component 240, while images having a contrast above such a contrast threshold can have a lower level of contrast adjustments 243 applied thereto.

As yet another example, the graphical modifications component 240 can apply graphical modifications that specifically target those areas of individual images that depict the user or portions of the user, such as a user's eyes, hair, skin or other like portions. For example, the graphical modifications component 240 can apply skin tone smoothing 242 to reduce the appearance of blemishes on the user's skin. Such skin tone smoothing 242 can, for example, detect pixels whose location and color is indicative of being graphical representations of the user's skin, and can then reduce a variance within the colors assigned to such pixels. As another example, the graphical modifications component 240 can detect pixels whose location in color is indicative of being graphical representations of the user's eyes and can then increase the intensity of the colors of those pixels to make the user's eyes appear brighter or more intense. Other similar graphical modifications can be applied by the graphical modifications component 240. As with the background replacement functionality 241, other application programs can be utilized to provide the skin tone smoothing functionality 242, the eye brightening functionality, or other like graphical modification functionality. For example, social media applications that are often utilized to post images of the user, such as "selfie" images, often include skin tone smoothing, eye brightening and other like functionality. In such an example, the graphical modifications component 240 can invoke the functionality of such social media applications to perform the relevant graphical modifications on one or more of the images of the first filtered subset of images 230.

According to one aspect, a graphically modified first filtered subset of images 250 can be generated by applying graphical modifications, by the graphical modifications component 240, such as detailed above, to the first filtered subset of images 230. The graphically modified first filtered subset of images 250 can then be evaluated by an image selection component, such as the exemplary image selection component 260, to select at least one image, such as the first selected image 270, which may be presented to the user as a potential update to the user's profile picture.

One mechanism by which the image selection component 260 can select the first selected image 270 can be to determine scores for individual ones of the graphically modified first filtered subset of images 250. Such scores can be determined based upon factors analogous to those utilized by one or more of the filter component 220 and/or the graphical modifications component 240. For example, the image selection component 260 can assign scores to individual images based on combinations of one or more colorimetric attribute determinations, such as the exemplary colorimetric attribute determinations 261, which can be the same as or analogous to the colorimetric attribute determinations 223 utilized by the filter component 220. Alternatively, the image selection component 260 can utilize different colorimetric attribute determinations 261 from the colorimetric attribute determinations 223 utilized by the filter component 220. For example, the filter component 220 can filter the first set of images 210 based on a determined image contrast, while the image selection component 260 can score images of the graphically modified first filtered subset of images 250 based upon a closeness of the white point of those images to a reference white point. As another example, the filter component 220 and the image selection component 260 can both utilize the same colorimetric attribute determination such as, for example, an image white point. However, while the filter component 220 can filter out images of the first set of images 210 whose image white point is too far away from a reference white point, in other words beyond a white point threshold value, the image selection component 260 can assign scores such that images having a determined white point that is closer to the reference white point will receive higher scores than images having a determined white point that is further from the reference white point. As such, while utilizing the same colorimetric attribute determination, the filter component 220 can utilize a threshold to make a binary determination, while the image selection component 260 can assign scores along a continuum of values.

Analogously, the image selection component 260 can assign scores to individual images based on combinations of one or more facial feature positioning determinations, such as the exemplary facial feature positioning determinations 262, which can be the same as or analogous to the facial feature positioning determinations 224 utilized by the filter component 220. Alternatively, the image selection component 260 can utilize different facial feature positioning determinations 262 from the facial feature positioning determinations 224 utilized by the filter component 220. For example, the filter component 220 can filter the first set of images 210 based on the user's mouth being open in the image, while the image selection component 260 can score images of the graphically modified first filtered subset of images 250 based upon how open a user's eyes are. As another example, the filter component 220 and the image selection component 260 can both utilize the same facial feature positioning determination such as, for example, how open the user's eyes are. However, while the filter component 220 can filter out images of the first set of images 210 whose when the users eyes are closed, the image selection component 260 can assign scores such that images depicting the user with more open eyes will receive higher scores than images depicting the user with eyes that are more closed. As such, while utilizing the same facial feature positioning determination, the filter component 220 can utilize a threshold to make a binary determination, while the image selection component 260 can assign scores along a continuum of values. The specific values can be established beforehand based on predetermined facial feature positions. For example, facial feature positions that appeal to a user's vanity, such as fully open eyes, can be assigned higher scores. By contrast, eyes that are half closed, which often result in images that users consider to be embarrassing, can be assigned lower scores. Similar score assigning can be performed based on other facial features, such as mouth, eye brows, and the like.

As with the filter component 220, the image selection component 260 can utilize multiple ones of the colorimetric attribute determinations 261 and/or the user facial feature positioning determinations 262 to score an image. For example, an image score can be based on an aggregation of individual scores assigned to individual ones of the colorimetric attribute determinations 261, such as individual scores, separately assigned, based on image contrast, image color intensity, image white points, and other like colorimetric attribute determinations. Analogously, an image score can be based on an aggregation of individual scores assigned to individual ones of the facial feature positioning determinations 262, such as individual scores, separately assigned, based on how open the user's eyes are, how open the user's mouth is, and other like facial feature positioning attribute determinations. As another example, the image score can be based on an aggregation of individual scores assigned to individual ones of the colorimetric attribute determinations 261 and the facial feature positioning determinations 262. The image selection component 260 can compute scores for multiple ones of the graphically modified first filtered subset of images 250, and can then select the first selected image 270 based on the most extreme score, which can be either the highest score or the lowest score depending upon how scores are assigned. The image having such a most extreme score can be the first selected image 270.

According to another aspect, the image selection component 260 can select images, not on computed scores, but rather through the utilization of one or more machine learning processes which can be trained to select images that human users will perceive as most applicable as profile images. For example, during a training phase a series of profile images can be provided that have been selected as examples of desirable profile images. For example, the training set of images can be stock images taken by professional photographers of professional models, such as images from fashion magazines, since such images can be reference examples of vanity-maximizing images. As another example, the training set of images can be obtained from sources suggestive of desirable profile images, such as professional social network user profiles and the like. The training set of images can be provided with another set of images that can depict less desirable profile images, and the sets can be tagged accordingly. As part of the training, different weight values will be automatically established for different aspects of the machine learning algorithm, such as different weights applied to different levels, or iterations, of a neural network. Once trained, the machine learning algorithm can be provided individual images of the graphically modified first filtered subset of images and can output a single image, as the first selected image 270.

A user notification generation component, such as the exemplary user notification generation component 280 can compare the first selected image 270 to a current profile image 290 in order to determine whether the first selected image 270 is sufficiently better and/or different to warrant generating a user notification providing the first selected image 270 as a suggested update to the user's profile image. According to one aspect, the user notification generation component 280 can seek to determine if the first selected image 270 is indicative of a change in the user's appearance from when the user's current profile image 290 was taken. For such a determination, the user notification generation component 280 can perform a pixel-based difference determination, such as the exemplary pixel-based difference determination 283.

The pixel-based difference determination 283 can compare corresponding pixels between the first selected image 270 and the current profile image 290. For example, a change in the user's appearance is often manifested through different hair color or hairstyle. Accordingly, the pixel-based difference determination 283 can compare pixels above the user's face in the first selected image 270 to corresponding pixels above the user's face in the current profile image 290. Differences in color among the pixels can suggest that the user has changed their hair color, while differences in color only among the pixels around the user's neck area can suggest the user has either grown out, or cut short their hair. If the differences are greater than a notification threshold 281, an appropriate user interface element, such as those detailed above, represented in the exemplary system 200 of FIG. 2 as the graphical user interface element 150, can be generated by the user notification generation component 280. Utilization of the notification threshold 281 can avoid triggering notifications for minor differences among the pixels, such as can be accounted for simply due to a change in lighting, as opposed to a change in actual hair color or hairstyle.

As another example, sometimes a user's appearance can change due to the presence or absence of a beard or other facial hair. Accordingly, the pixel-based difference determination 283 can compare pixels below the user's face in the first selected image 270 to corresponding pixels below the user's face in the current profile image 290. Differences in color among the pixels can suggest that the user has either grown a beard or shaved off a beard that was present previously. If the differences are greater than the notification threshold 281, an appropriate user interface element, such as the exemplary graphical user interface element 150, can be generated by the user notification generation component 280.

In some instances, the current profile image 290 may not be an image of the user at all. For example, the current profile image 290 can be a stock photo of an item such as a tennis ball or flower, or can be an image of a cartoon character, or other like item that is not the user. In such instances, the pixel-based difference determination 283 can be based on an aggregate difference among the pixels of the entire image, rather than just pixels from a defined area. However, such entire image differences can trigger different user interface element wording. For example, the user interface element can notify the user that their current profile image 290 does not, in fact, appeared to be an image of the user at all, and can recommend the first selected image 270 as according the user the aforementioned benefits of an accurate profile image, including enabling viewing users to respond more favorably to the user.

According to another aspect, the user notification generation component 280 can provide the user with the opportunity to improve their current profile image 290 by suggesting the first selected image 270 even though there may not be a specific change in the user's appearance since the current profile image 290 was set. For example, the first selected image 270 may be more professional, more strongly appeal to the user's vanity or an otherwise better profile image. Accordingly, the user notification generation component 280 can utilize a score-based difference determination, such as the exemplary score-based difference determination 282. Such a score-based difference determination 282 can determine a score of the current profile image 290 and compare such a score to that of the first selected image 270. According to one aspect, the score-based difference determination 282 can generate a score for the current profile image 290 in the same manner that the image selection component 260 generated a score for the first selected image 270. The image selection component 260 can pass, to the user notification generation component 280, both the first selected image 270 and the corresponding score. In such a manner user notification generation component 280 need only compute the score for one image, namely the current profile image 290. According to an alternative aspect, however, the score-based difference determination 282 can differ from the scores determined by the image selection component 260. In such an alternative aspect, the user notification generation component 280 can generate scores for both the first selected image 270 and for the current profile in which 290 utilizing the different scoring mechanism. The scoring applied by the user notification generation component 280 can include any one or more of the scoring mechanisms detailed above.

If the user notification generation component 280 determines that the first selected image 270 has a more extreme score than the current profile image 290, which can either be a lower score or a higher score, depending on how scores are determined, then the user notification generation component 280 can generate a user interface element, such as the exemplary graphical user interface element 150, suggesting that the user change their profile image to the first selected image 270. According to one aspect, the difference between the score of the current profile image 290 and the score of the first selected image 270 can be greater than a notification threshold in order for the user notification generation component 280 to trigger generation of the user interface element. In such a manner, the notification threshold 281 can be an expression of how much better, as quantified by a delta between the two scores, the first selected image 270 needs to be in order to trigger the generation of the user interface element 150.

While the exemplary system 200 of FIG. 2 has been described in serial, one or more of the individual components can also execute in parallel, or one component can be processing a subsequent set of images while one or more other components are still processing a previous set of images. For example, while the user notification generation component 280 is determining whether to generate the graphical user interface element 150 and present the first selected image 270 to a user, a subsequent set of images can be received by the filter component 220, analogous to the manner detailed above with respect to the first set of images 210, which images will ultimately be processed by the filter component 220, the graphical modifications component 240 and the image selection component 260 to generate a new selected image. Depending on whether a user notification was generated by the user notification generation component 280 in regards to the first selected image 270, the user notification generation component 280 can subsequently decide whether to generate another user notification, or the first user notification if a prior user notification was not generated, for a subsequent selected image. In such a manner, the operation of the system shown in FIG. 2 continues in a loop. With each iteration, however, it can become more difficult to exceed the notification threshold 281, and fewer user notifications can be generated. For example, it may be difficult for a subsequent image to be assigned a score that is more extreme than the score assigned to the first selected image 270 such that the difference and two scores exceeds the notification threshold 281, because the first selected image 270 can "set a high bar" or can otherwise have a sufficiently high score to minimize subsequent user notifications.

Figure 3:
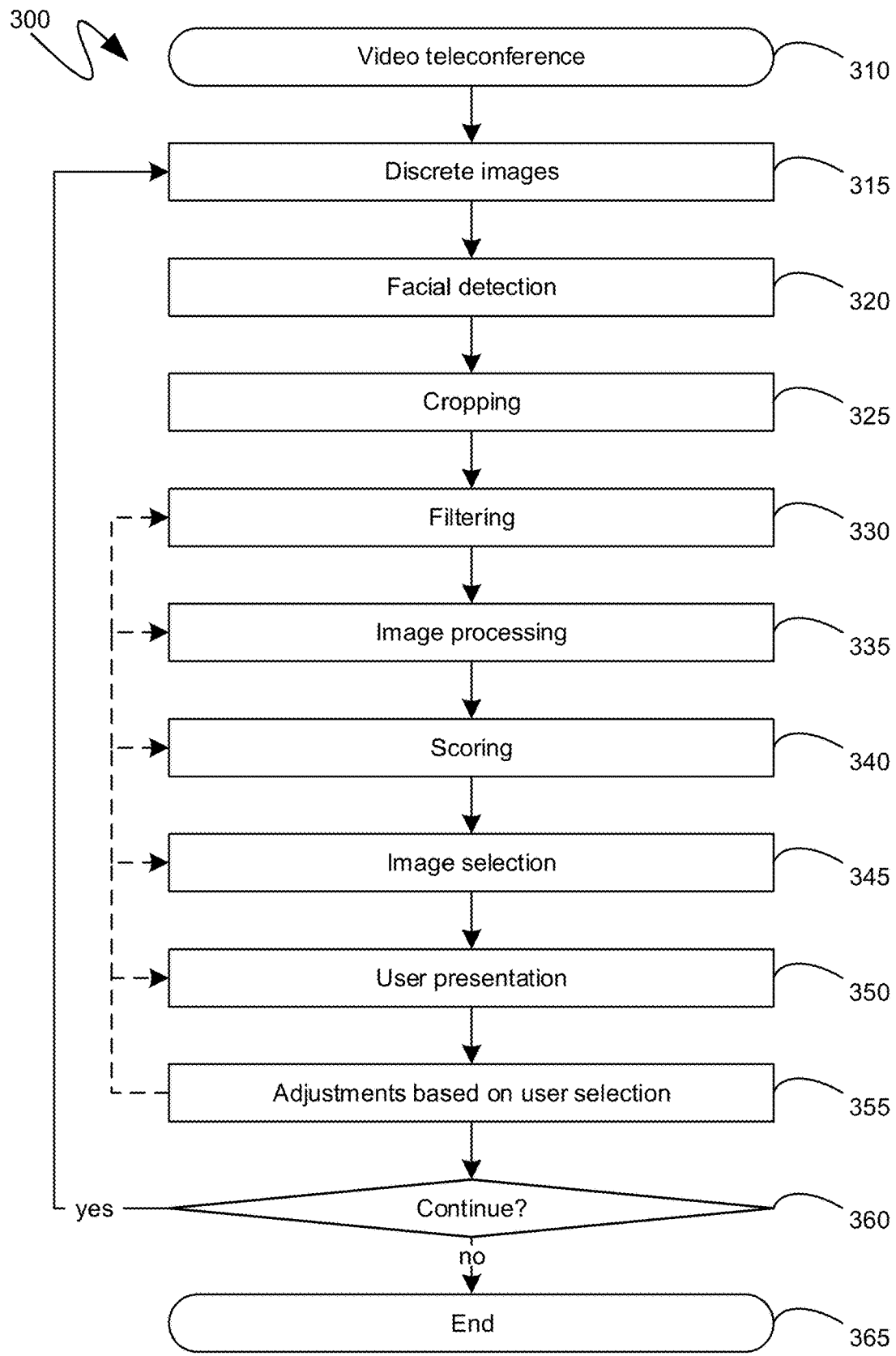
FIG. 3 is a flow diagram of an exemplary series of steps for selecting and generating user notifications of potential user profile pictures curated from video teleconference data.

Turning to FIG. 3, the exemplary flow diagram 300 shown therein illustrates an exemplary series of steps by which a user profile picture can be automatically generated and suggested to a user, such as by the automated profile picture update process detailed above. Initially, at step 310, a video teleconference can have been initiated or can be ongoing. At step 315 a set of discrete images, including still images and/or live images, can be received, such as in the manner detailed above. At step 320 a facial detection mechanism can be implemented to facilitate a cropping at step 325 that can remove pixels extending beyond a certain range from the identified face detected at step 320, such as in the manner detailed above. The facial detection of step 320 can, as also detailed above, commence in the middle of an image to take advantage of user-centering or other like video teleconference specific aspects of the images obtained at step 315. The cropped images can then be filtered at step 330. As detailed above, such filtering can be based on colorimetric attributes, facial feature positioning, or combinations thereof. Subsequently, at step 335, various image processing or graphical modifications can be applied to the images. As detailed above such image processing can include increasing colorimetric attributes, applying graphical filters to and image as a whole, or discrete portions of an image, and other like image processing. As also indicated previously, the image processing at step 335 can leverage, or can be completely performed by, computer-executable instructions that are part of other application programs such as, for example, social media or image editing application programs.

At step 340, the images can be scored. According to one aspect, scores can be assigned to individual colorimetric attributes, individual facial feature positioning, or one or more combinations thereof, and a score associated with an image can be an aggregation of the individual attribute scores of the individual attributes of such an image. An image associated with a most extreme score, which can be either a highest score or a lowest score, depending on how the scores are assigned, can be selected at step 345. According to another aspect, the scoring of step 340 and selection of step 345 can be a single step performed by machine learning processes which can be trained to identify desirable profile images, with such training setting weights and other like variable values which can then be applied to the images to result in the image selection step 345. At step 350, a determination can be made whether a graphical user interface, informing the user of the image selected at step 345, is presented to the user. As detailed above, such a determination can be made on whether the image selected at step 345 evidences that an appearance of the user has changed. Alternatively, or in addition, such determination can be made and whether the image selected at step 345 is a better representation of the user than the user's current profile image. As indicated previously, such determinations can be made based on comparisons between the image selected at step 345 and the user's current profile image, with the user presentation only being generated if a notification threshold is exceeded in performing such a comparison.

The determination, at step 350, as to whether to generate a user presentation of a suggested image, such as in the form of a generated graphical user interface element presented to the user via display device communicationally coupled to the computing device being utilized by the user, can be based on user actions on the computing device. For example, a user presentation can be generated in response to a triggering event, such as the commencement of a subsequent video teleconference in which the user is only visible by their profile picture, such as if the user has not activated the video functionality, or has joined the teleconference from a device that is not communicationally coupled to a video image camera. As another example a triggering event can be the initiation of a communication, such as the drafting of an email, or the initiation of the transmission thereof, which can include, or otherwise communicate, the user's profile picture. As yet another example of a triggering event, the user notification can be generated upon discreet computing events, such as the user logging into a computing device. Additionally, the nature of the difference between the image selected at step 345 and the user's current profile picture can inform which triggering event triggers the user presentation of step 350. For example, if it is detected that the user is utilizing a cartoon character as their profile picture, then the image selected at step 345 can be presented more urgently as a suggested update to the user's profile picture than, for example, if the image selected at step 345 is simply a better looking image of the user than the user's current profile picture.

At step 355, adjustments to one or more of steps 330, 335, 340, 345 and/or 350 can be made based on the user selection in response the user presentation at step 350. For example, if the user chooses not to select the image selected at step 345, and presented to the user as part of the user notification at step 350, then the notification threshold utilized in determining whether to generate the user presentation, at step 350 can be increased so that, in the future, the user is only notified if the selected image is even more substantially different or improved from the user's current profile image. As another example, if the user chooses not to select the image, the scoring of step 340 and/or the image selection of step 345 can be modified to, for example, more highly weight different attributes that may be more desirable to user than the currently weighted attributes. In the case where steps 340 and 345 are performed by a trained machine learning algorithm, an alternative, differently trained, machine learning algorithm, utilizing different weights or other like variable values, can be utilized instead. As yet another example, if the user chooses not to select the image, the image processing applied at step 335 can be changed to apply different types of image processing. For example, the image processing at step 335 can no longer increase color saturation, but can instead, smooth skin tone. As yet another example, if the user chooses not to select the image, the filtering applied at step 330 can be modified such as, for example, by increasing various thresholds, such as those detailed above, to filter a greater quantity, or different types, of images.

While the steps of the exemplary flow diagram 300 are illustrated is proceeding in a sequence, one or more of the steps 320, 325, 330, 335 and/or 340 can be optional. For example, the images obtained at step 315 can be provided directly to a trained machine learning algorithm to result in the image selection 345 without performing steps 320, 325, 330, 335 and/or 340. As another example, the images obtained at step 315 can be provided directly to step 340 without performing any of the illustrated intermediate steps. As yet another example, the images obtained at step 315 can be provided to step 330 without performing the efficiency-targeted cropping of step 325, and the facial detection, at step 320, that can inform such cropping.

At step 360 a determination can be made as to whether the user has indicated that they no longer wish to be notified of automatically generated, videoconference-sourced suggested profile images. If the user has so indicated, then the relevant processing can end at step 365. Alternatively, some or all of the steps 315-355 can continue to be performed for subsequent portions of a single video teleconference, or subsequent video teleconferences.

While the above descriptions have been provided within the context of an existing user profile picture that the user can select to update or improve with the described mechanisms, including existing user profile pictures that may not be of the user at all, such as profile images of the user's children, the user's pets, cartoon characters, objects, or the like, the above descriptions are equally applicable when the user has no profile picture whatsoever. More specifically, and as already detailed, when determining, such as at step 350, whether to generate a user notification and, thereby, present a suggested image to the user, such as the image selected at step 345, a comparison can be made between a score assigned to the selected image and a score of the user's existing profile picture. According to one aspect, if the user has no profile picture whatsoever, a default score can be utilized to ensure that even the first suggested picture, selected at step 345, will be of at least a threshold quality. In such an instance, the scoring of a user's existing profile picture can first determine whether any such profile picture exists and, if it does not, the scoring process can simply output the default score without further scoring-related processing. According to another aspect, if the user has no profile picture whatsoever, a zero score, or a null value, can be utilized. In such an instance, the image selected at step 345 will likely be presented to the user. If the user selects such an image, then that image will serve as the existing user profile picture for subsequent iterations. However, if the user does not select such an image, then, in accordance with step 355, the relevant threshold utilized at step 350 can be increased so that a subsequent image will not be presented unless it is even higher scoring than the image rejected by the user. As can be seen, the described mechanisms are equally applicable and utilizable in instances where the user has no current profile picture.

Figure 4:
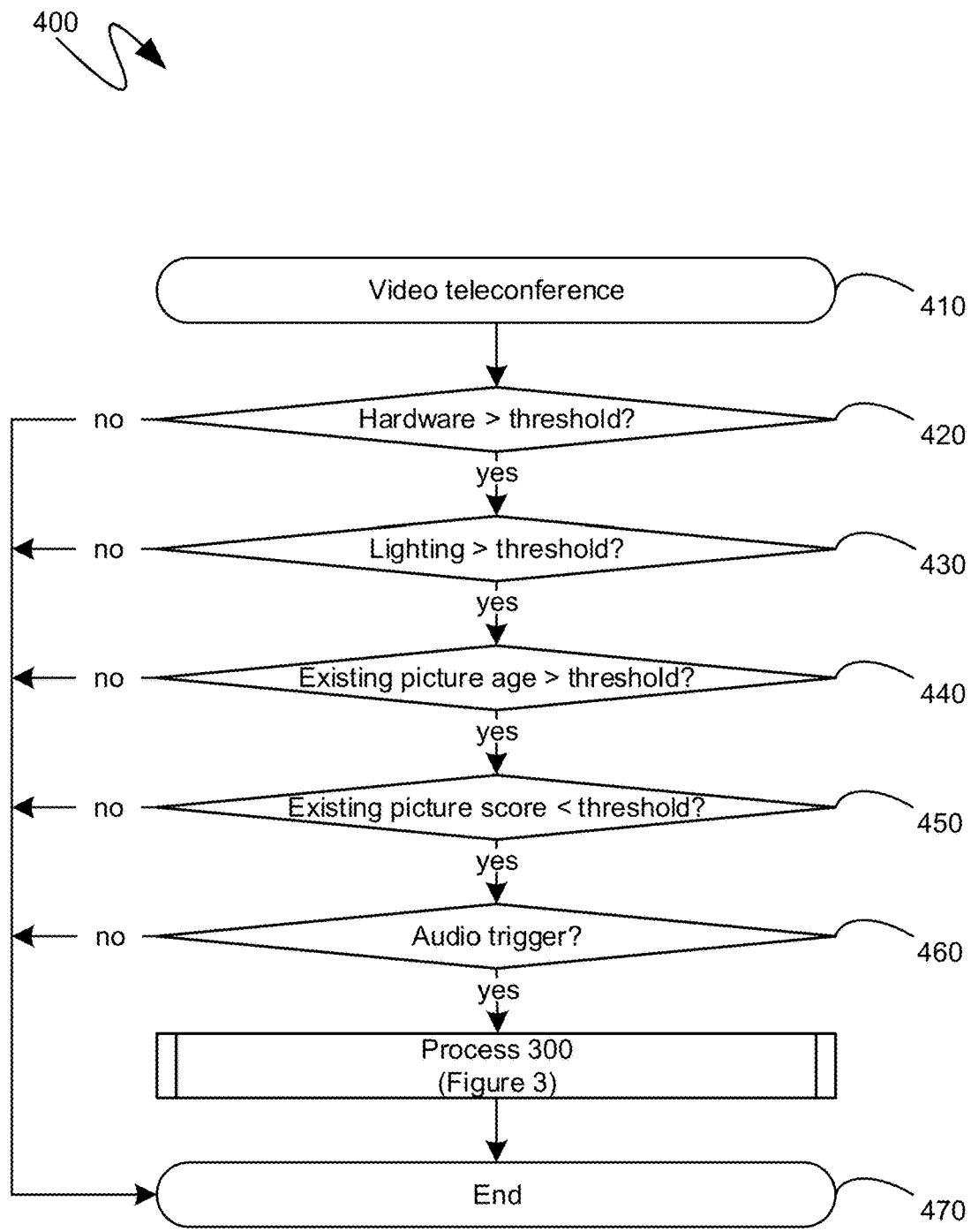
FIG. 4 is a flow diagram of an exemplary series of steps for triggering the execution of an automated profile picture updating process.

Turning to FIG. 4, the exemplary flow diagram 400 shown therein illustrates an exemplary series of steps that can trigger, or avoid triggering, the processing described previously, including that illustrated by the process 300 shown in FIG. 3. As in the case of the exemplary process 300 shown in FIG. 3, while the triggers 420, for 30, 440, 450, 460 and 460 are illustrated in sequence, they can be alternatives of one another and any combination of one or more of them could be sufficient to trigger the process 300. For example, it may be sufficient for the audio trigger, at step 460, to trigger the process 300. In such an instance, detection of an audio trigger, at step 460, can cause the automated profile picture generation and selection steps to execute, with such processing otherwise not being performed until an audio trigger is detected. As detailed above, such an audio trigger can include discrete sounds, such as a user sneezing or coughing, which can deactivate existing automated profile picture generation and selection processing, or discrete sound such as laughing, which can trigger the activation of an otherwise dormant automated profile picture generation and selection processing. Is also detailed above, the audio trigger determination of step 460 can include vocal tonality analysis, and other like aspects of the user's voice to detect specific emotions, such as anger, stress or, conversely, happiness, with the latter acting as a trigger to initiate the automated profile picture processing.

As another example, comparison to various thresholds can trigger automated profile picture processing to execute, with such automated profile picture processing otherwise remaining dormant. For example, at step 420, it can be determined whether various hardware requirements, such as a resolution of a user facing camera communicationally coupled to the computing device on which the user is having a video teleconference, such as the video teleconference of step 410, are of sufficient capability to render the automated profile picture processing worthwhile. For example, at step 420, the automated profile picture processing can only be activated if the videoconference of step 410 is being conducted on a computing device having a user-facing camera that has greater than 720 lines of vertical resolution. Other hardware-based thresholds, such as a minimum ten megapixel resolution of the user-facing camera, can also be established. As another example, at step 430, it can be determined whether various environmental requirements, such as external lighting, are sufficient to render the automated profile picture processing worthwhile. For example, if the environmental lighting is below threshold, such as can be determined by analysis of video being captured having a lower than threshold brightness or a lower than threshold contrast, the automated profile picture processing can remain deactivated.

Other triggers can be based on the user's current profile picture. For example, if the user has recently set their profile picture, such as can be determined by comparing the age of the profile picture to a threshold age, such as at step 440, then the automated profile picture processing can remain deactivated. By contrast, if the user has set their profile picture more than a threshold quantity of days prior, the process 300 of FIG. 3 can be activated. Similarly, if the user's current profile picture has a score that is below threshold, determined utilizing any of the mechanisms detailed above, the process 300 of FIG. 3 can be activated. By contrast, if the user's current profile picture has a high score, then automated profile picture processing may not be currently useful and can remain deactivated to increase processing efficiency, and reduce memory utilization.

Figure 5:
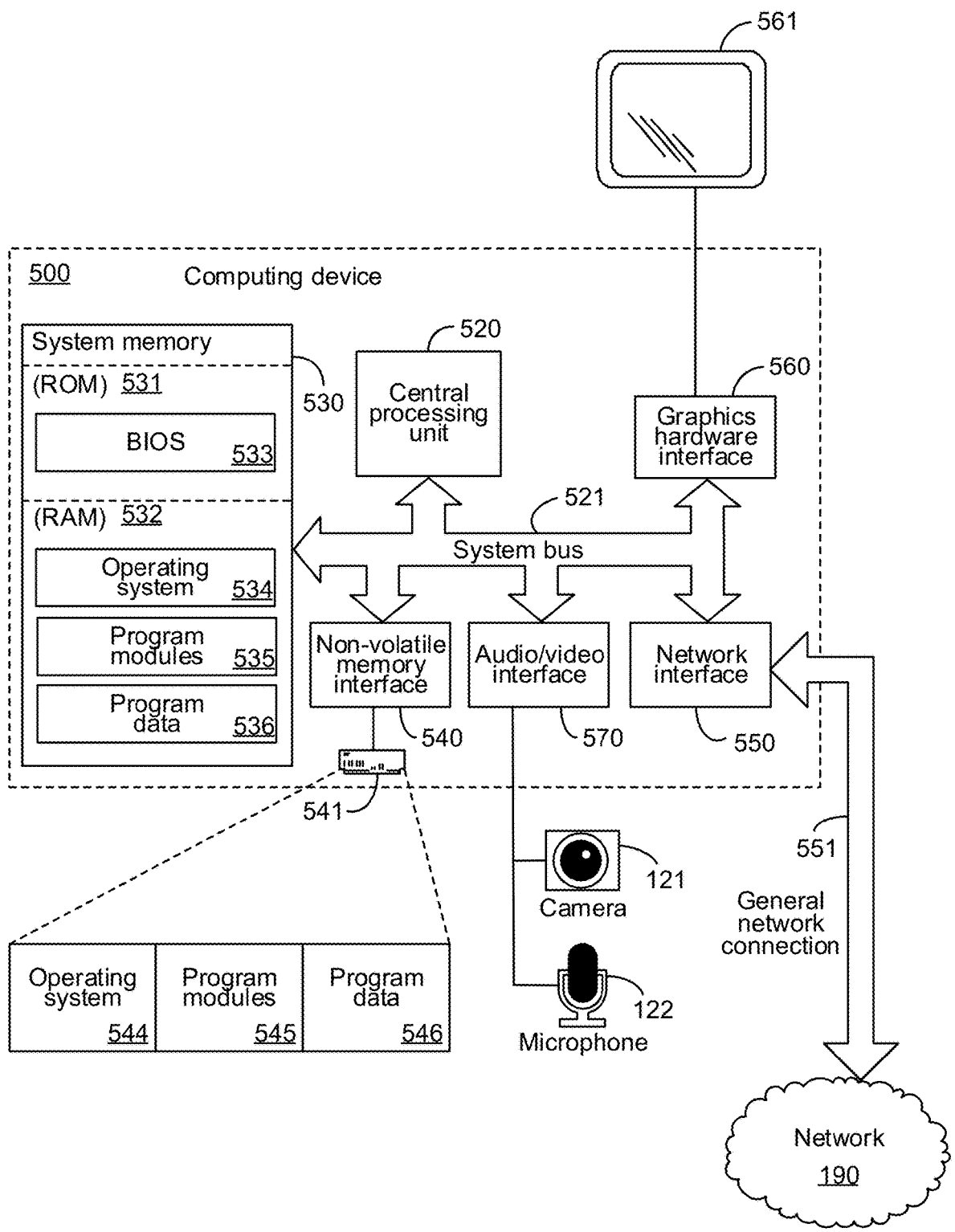
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 560 and a display device 561, which can include display devices capable of receiving touch-based user input, such as a touch-sensitive, or multi-touch capable, display device. Additionally, the computing device 500 can optionally include an audio/video interface, such as the exemplary audio/video interface 570 that can be communicationally coupled to the system bus 521 and can support standardized peripheral and/or extension communication protocols to allow additional hardware devices to be communicationally coupled with the computing device 500. By way of example, the exemplary camera 121 and/or microphone 122 can be communicationally coupled to the system bus 521 via the audio/video interface 570. The exemplary camera 121 and/or microphone 122 can be part of the physical housing of the computing device 500, or can be separate peripheral hardware devices that are communicationally coupled to the exemplary computing device 500. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 500. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer content between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 551 (to the network 190) through a network interface or adapter 550, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 551. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 540, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: a one or more processing units; and computer-readable media comprising computer-executable instructions, which, when executed by at least some of the one or more processing units, cause the computing device to: obtain a first set of images from a video teleconference in which a user of the computing device is participating; select a first selected image from the first set of images; determine whether a difference between the first selected image and a current profile image associated with the user is greater than a notification threshold; and cause a graphical user interface element to be generated on a display device communicationally coupled to the computing device in response to determining that the difference is greater than the notification threshold, the graphical user interface comprising a recommendation to the user to change the current profile image associated with the user to the first selected image.

A second example is the computing device of the first example, wherein the computer-readable media comprise further computer-executable instructions, which, when executed by the at least some of the one or more processing units, cause the computing device to: filter the first set of images to remove images having at least one of: a colorimetric attribute below a colorimetric attribute threshold or a depicted user facial feature positioning below a user facial feature positioning threshold; and graphically modify the first filtered subset of images to perform at least one of: background replacement or graphical filter application, thereby generating a graphically modified first filtered subset of images; wherein the computer-executable instructions which cause the computing device to select the first selected image from the first set of images comprise computer-executable instructions which, when executed by the at least some of the one or more processing units, cause the computing device to select the first selected image from the graphically modified first filtered subset of images A third example is the computing device of the second example, wherein the computer-readable media comprise further computer-executable instructions, which, when executed by the at least some of the one or more processing units, cause the computing device to: detect the user's face in the first set of images, the facial detection commencing at an image center; and crop the first set of images based on a detected location of the user's face in the first set of images; wherein the detecting the user's face and the cropping are performed prior to the filtering.

A fourth example is the computing device of the second example, wherein the computer-executable instructions which cause the computing device to filter the first set of images comprise computer-executable instructions, which, when executed by the at least some of the one or more processing units, cause the computing device to: filter the first set of images to remove images based on audio associated with the first set of images from the video teleconference.

A fifth example is the computing device of the fourth example, wherein the audio associated with the first set of images on which the first set of images is filtered comprises at least one of: coughing, laughing, yelling and yawning.

A sixth example is the computing device of the second example, wherein the computer-executable instructions which cause the computing device to graphically modify the first filtered subset of images comprise computer-executable instructions, which, when executed by the at least some of the one or more processing units, cause the computing device to: apply, to the first filtered subset of images, a graphical modification that reduces variances between pixels to smooth an appearance of the user's skin in the graphically modified first filtered subset of images.

A seventh example is the computing device of the first example, wherein the computer-executable instructions which cause the computing device to select the first selected image comprise computer-executable instructions, which, when executed by the at least some of the one or more processing units, cause the computing device to: generate scores for multiple images from the first set of images; and select the first selected image based on the generated scores; and wherein the computer-executable instructions which cause the computing device to determine whether the difference is greater than the notification threshold comprise computer-executable instructions, which, when executed by the at least some of the one or more processing units, cause the computing device to: generate a score for the current profile image in a same manner as for the multiple images from the first set of images; and determine a difference between a score for the first selected image and the score for the current profile image.

An eighth example is the computing device of the seventh example, wherein the computer-executable instructions which cause the computing device to generate the scores comprise computer-executable instructions, which, when executed by the at least some of the one or more processing units, cause the computing device to: generate the scores for the multiple images from the first set of images based on colorimetric attributes of the multiple images from the first set of images.

A ninth example is the computing device of the seventh example, wherein the computer-executable instructions which cause the computing device to generate the scores comprise computer-executable instructions, which, when executed by the at least some of the one or more processing units, cause the computing device to: generate the scores for the multiple images from the first set of images based on user facial feature positioning depicted in the multiple images from the first set of images.

A tenth example is the computing device of the first example, wherein the computer-executable instructions which cause the computing device to determine whether the difference is greater than the notification threshold comprise computer-executable instructions, which, when executed by the at least some of the one or more processing units, cause the computing device to: determine that the difference is greater than the notification threshold based on detecting a difference in at least one of: the user's hair length, the user's hair color, or the user's facial hair.

An eleventh example is the computing device of the second example, wherein the computer-readable media comprise further computer-executable instructions, which, when executed by the at least some of the one or more processing units, cause the computing device to: select different graphical modifications with which to graphically modify a subsequent filtered subset of images based upon the user declining to change the current profile image associated with the user in response to the generation of the graphical user interface.

A twelfth example is the computing device of the first example, wherein the computer-readable media comprise further computer-executable instructions, which, when executed by the at least some of the one or more processing units, cause the computing device to: increase the notification threshold based upon the user declining to change the current profile image associated with the user in response to the generation of the graphical user interface.

A thirteenth example is the computing device of the first example, wherein each image in the first set of images is a live image comprising a sequence of two or more still images which, when sequentially displayed, generate an appearance of user movement within the live image.

A fourteenth example is a computing device comprising: a one or more processing units; and computer-readable media comprising computer-executable instructions, which, when executed by at least some of the one or more processing units, cause the computing device to: trigger execution of an automated profile picture update process based upon audio obtained from a video teleconference in which a user of the computing device is participating; wherein the automated profile picture update process comprises computer-executable instructions, which, when executed by the at least some of the one or more processing units, cause the computing device to: obtain a first set of images from the video teleconference; select a first selected image from the first set of images; and cause a graphical user interface element to be generated on a display device communicationally coupled to the computing device, the graphical user interface comprising a recommendation to the user to change a current profile image associated with the user to the first selected image.

A fifteenth example is the computing device of the fourteenth example, wherein the computer-executable instructions which cause the computing device to trigger execution of the automated profile picture update process comprise computer-executable instructions, which, when executed by the at least some of the one or more processing units, cause the computing device to: trigger execution of an automated profile picture update process upon detecting laugher from the user in the audio obtained from the video teleconference.

A sixteenth example is the computing device of the fourteenth example, wherein the automated profile picture update process comprises further computer-executable instructions, which, when executed by the at least some of the one or more processing units, cause the computing device to: filter the first set of images to remove images having at least one of: colorimetric attributes below a colorimetric attribute threshold or depicted user facial feature positioning below a user facial feature positioning threshold; and graphically modify the first filtered subset of images to perform at least one of: background replacement or graphical filter application, thereby generating a graphically modified first filtered subset of images; wherein the computer-executable instructions which cause the computing device to select a first selected image from the first set of images comprise computer-executable instructions, which, when executed by the at least some of the one or more processing units, cause the computing device to select the first selected image from the graphically modified first filtered subset of images.

A seventeenth example is the computing device of the fourteenth example, wherein the computer-executable instructions which cause the computing device to generate the graphical user interface element comprise computer-executable instructions, which, when executed by the at least some of the one or more processing units, cause the computing device to: determine whether a difference between the first selected image and a current profile image associated with the user is greater than a notification threshold; and generate the graphical user interface element only in response to determining that the difference is greater than the notification threshold, the graphical user interface comprising a recommendation to the user to change the current profile image associated with the user to the first selected image.

An eighteenth example is the computing device of the seventeenth example, wherein the computer-executable instructions which cause the computing device to select the first selected image comprise computer-executable instructions, which, when executed by the at least some of the one or more processing units, cause the computing device to: generate scores for multiple ones of the first set of images; and select the first selected image based on the generated scores; and wherein the computer-executable instructions which cause the computing device to determine whether the difference is greater than the notification threshold comprise computer-executable instructions, which, when executed by the at least some of the one or more processing units, cause the computing device to: generate a score for the current profile image in a same manner as for the ones of the first set of images; and determine a difference between a score for the first selected image and the score for the current profile image.

A nineteenth example is a computing device comprising: a one or more processing units; and computer-readable media comprising computer-executable instructions, which, when executed by at least some of the one or more processing units, cause the computing device to: trigger execution of an automated profile picture update process based upon determining at least one of: a video camera communicationally coupled to the computing device exceeds video camera hardware threshold requirements, the video camera being utilized by a user of the computing device to participate in a video teleconference; a colorimetric attribute of one or more images from the video teleconference being above a colorimetric attribute threshold; a current profile image associated with the user being older than a profile image age threshold; or a current profile image associated with the user having a score below a profile image wherein the automated profile picture update process comprises computer-executable instructions, which, when executed by the at least some of the one or more processing units, cause the computing device to: obtain a first set of images from the video teleconference; select a first selected image from the first set of images; and cause a graphical user interface element to be generated on a display device communicationally coupled to the computing device, the graphical user interface comprising a recommendation to the user to change the current profile image associated with the user to the first selected image.

A twentieth example is the computing device of the nineteenth example, wherein the automated profile picture update process comprises further computer-executable instructions, which, when executed by the at least some of the one or more processing units, cause the computing device to: filter the first set of images to remove images having at least one of: colorimetric attributes below a colorimetric attribute threshold or depicted user facial feature positioning below a user facial feature positioning threshold; and graphically modify the first filtered subset of images to perform at least one of: background replacement or graphical filter application, thereby generating a graphically modified first filtered subset of images; wherein the computer-executable instructions which cause the computing device to select a first selected image from the first set of images comprise computer-executable instructions, which, when executed by the at least some of the one or more processing units, cause the computing device to select the first selected image from the graphically modified first filtered subset of images.

As can be seen from the above descriptions, mechanisms for automatically selecting and generating user notifications of potential user profile pictures curated from video teleconference data have been presented. In view of the many possible variations of the subject matter described herein, we claim as our invention all such embodiments as may come within the scope of the following claims and equivalents thereto.

I claim:

1. A computing device comprising:
   a one or more processing units; and
   computer storage media comprising computer-executable instructions, which, when executed by at least some of the one or more processing units, cause the computing device to:
   obtain a first set of images from a video teleconference in which a user of the computing device is participating;
   select a first selected image from the first set of images;
   determine whether a difference between the first selected image and a current profile image associated with the user is greater than a notification threshold; and
   cause a graphical user interface element to be generated on a display device communicationally coupled to the computing device in response to determining that the difference is greater than the notification threshold, the graphical user interface comprising a recommendation to the user to change the current profile image associated with the user to the first selected image.

2. The computing device of claim 1, wherein the computer-readable media comprise further computer-executable instructions, which, when executed by the at least some of the one or more processing units, cause the computing device to:
   filter the first set of images to remove images having at least one of: a colorimetric attribute below a colorimetric attribute threshold or a depicted user facial feature positioning below a user facial feature positioning threshold; and
   graphically modify the first filtered subset of images to perform at least one of: background replacement or graphical filter application, thereby generating a graphically modified first filtered subset of images;
   wherein the computer-executable instructions which cause the computing device to select the first selected image from the first set of images comprise computer-executable instructions which, when executed by the at least some of the one or more processing units, cause the computing device to select the first selected image from the graphically modified first filtered subset of images.

3. The computing device of claim 2, wherein the computer-readable media comprise further computer-executable instructions, which, when executed by the at least some of the one or more processing units, cause the computing device to:
   detect the user's face in the first set of images, the facial detection commencing at an image center; and
   crop the first set of images based on a detected location of the user's face in the first set of images;
   wherein the detecting the user's face and the cropping are performed prior to the filtering.

4. The computing device of claim 2, wherein the computer-executable instructions which cause the computing device to filter the first set of images comprise computer-executable instructions, which, when executed by the at least some of the one or more processing units, cause the computing device to:
   filter the first set of images to remove images based on audio associated with the first set of images from the video teleconference.

5. The computing device of claim 4, wherein the audio associated with the first set of images on which the first set of images is filtered comprises at least one of: coughing, laughing, yelling and yawning.

6. The computing device of claim 2, wherein the computer-executable instructions which cause the computing device to graphically modify the first filtered subset of images comprise computer-executable instructions, which, when executed by the at least some of the one or more processing units, cause the computing device to:
   apply, to the first filtered subset of images, a graphical modification that reduces variances between pixels to smooth an appearance of the user's skin in the graphically modified first filtered subset of images.

7. The computing device of claim 1,
   wherein the computer-executable instructions which cause the computing device to select the first selected image comprise computer-executable instructions, which, when executed by the at least some of the one or more processing units, cause the computing device to:
   generate scores for multiple images from the first set of images; and
   select the first selected image based on the generated scores; and
   wherein the computer-executable instructions which cause the computing device to determine whether the difference is greater than the notification threshold comprise computer-executable instructions, which, when executed by the at least some of the one or more processing units, cause the computing device to:
   generate a score for the current profile image in a same manner as for the multiple images from the first set of images; and
   determine a difference between a score for the first selected image and the score for the current profile image.

8. The computing device of claim 7, wherein the computer-executable instructions which cause the computing device to generate the scores comprise computer-executable instructions, which, when executed by the at least some of the one or more processing units, cause the computing device to:
   generate the scores for the multiple images from the first set of images based on colorimetric attributes of the multiple images from the first set of images.

9. The computing device of claim 7, wherein the computer-executable instructions which cause the computing device to generate the scores comprise computer-executable instructions, which, when executed by the at least some of the one or more processing units, cause the computing device to:
   generate the scores for the multiple images from the first set of images based on user facial feature positioning depicted in the multiple images from the first set of images.

10. The computing device of claim 1, wherein the computer-executable instructions which cause the computing device to determine whether the difference is greater than the notification threshold comprise computer-executable instructions, which, when executed by the at least some of the one or more processing units, cause the computing device to:
    determine that the difference is greater than the notification threshold based on detecting a difference in at least one of: the user's hair length, the user's hair color, or the user's facial hair.

11. The computing device of claim 2, wherein the computer-readable media comprise further computer-executable instructions, which, when executed by the at least some of the one or more processing units, cause the computing device to:

select different graphical modifications with which to graphically modify a subsequent filtered subset of images based upon the user declining to change the current profile image associated with the user in response to the generation of the graphical user interface.

12. The computing device of claim 1, wherein the computer-readable media comprise further computer-executable instructions, which, when executed by the at least some of the one or more processing units, cause the computing device to:

increase the notification threshold based upon the user declining to change the current profile image associated with the user in response to the generation of the graphical user interface.

13. The computing device of claim 1, wherein each image in the first set of images is a live image comprising a sequence of two or more still images which, when sequentially displayed, generate an appearance of user movement within the live image.

14. A computing device comprising:
a one or more processing units; and
computer storage media comprising computer-executable instructions, which, when executed by at least some of the one or more processing units, cause the computing device to:
trigger execution of an automated profile picture update process based upon audio obtained from a video teleconference in which a user of the computing device is participating;
wherein the automated profile picture update process comprises computer-executable instructions, which, when executed by the at least some of the one or more processing units, cause the computing device to:
obtain a first set of images from the video teleconference;
select a first selected image from the first set of images; and
cause a graphical user interface element to be generated on a display device communicationally coupled to the computing device, the graphical user interface comprising a recommendation to the user to change a current profile image associated with the user to the first selected image.

15. The computing device of claim 14, wherein the computer-executable instructions which cause the computing device to trigger execution of the automated profile picture update process comprise computer-executable instructions, which, when executed by the at least some of the one or more processing units, cause the computing device to:

trigger execution of an automated profile picture update process upon detecting laughter from the user in the audio obtained from the video teleconference.

16. The computing device of claim 14, wherein the automated profile picture update process comprises further computer-executable instructions, which, when executed by the at least some of the one or more processing units, cause the computing device to:

filter the first set of images to remove images having at least one of: colorimetric attributes below a colorimetric attribute threshold or depicted user facial feature positioning below a user facial feature positioning threshold; and graphically modify the first filtered subset of images to perform at least one of: background replacement or graphical filter application, thereby generating a graphically modified first filtered subset of images;

wherein the computer-executable instructions which cause the computing device to select a first selected image from the first set of images comprise computer-executable instructions, which, when executed by the at least some of the one or more processing units, cause the computing device to select the first selected image from the graphically modified first filtered subset of images.

17. The computing device of claim 14, wherein the computer-executable instructions which cause the computing device to generate the graphical user interface element comprise computer-executable instructions, which, when executed by the at least some of the one or more processing units, cause the computing device to:

determine whether a difference between the first selected image and a current profile image associated with the user is greater than a notification threshold; and generate the graphical user interface element only in response to determining that the difference is greater than the notification threshold, the graphical user interface comprising a recommendation to the user to change the current profile image associated with the user to the first selected image.

18. The computing device of claim 17, wherein the computer-executable instructions which cause the computing device to select the first selected image comprise computer-executable instructions, which, when executed by the at least some of the one or more processing units, cause the computing device to:

generate scores for multiple ones of the first set of images; and select the first selected image based on the generated scores; and wherein the computer-executable instructions which cause the computing device to determine whether the difference is greater than the notification threshold comprise computer-executable instructions, which, when executed by the at least some of the one or more processing units, cause the computing device to:

generate a score for the current profile image in a same manner as for the ones of the first set of images; and determine a difference between a score for the first selected image and the score for the current profile image.

19. A computing device comprising:
a one or more processing units; and
computer storage media comprising computer-executable instructions, which, when executed by at least some of the one or more processing units, cause the computing device to:
trigger execution of an automated profile picture update process based upon determining at least one of:
a video camera communicationally coupled to the computing device exceeds video camera hardware threshold requirements, the video camera being utilized by a user of the computing device to participate in a video teleconference;
a colorimetric attribute of one or more images from the video teleconference being above a colorimetric attribute threshold;
a current profile image associated with the user being older than a profile image age threshold; or a current profile image associated with the user having a score below a profile image;

wherein the automated profile picture update process comprises computer-executable instructions, which, when executed by the at least some of the one or more processing units, cause the computing device to:

obtain a first set of images from the video teleconference;

select a first selected image from the first set of images; and cause a graphical user interface element to be generated on a display device communicationally coupled to the computing device, the graphical user interface comprising a recommendation to the user to change the current profile image associated with the user to the first selected image.

20. The computing device of claim 19, wherein the automated profile picture update process comprises further computer-executable instructions, which, when executed by the at least some of the one or more processing units, cause the computing device to:

filter the first set of images to remove images having at least one of: colorimetric attributes below the colorimetric attribute threshold or depicted user facial feature positioning below a user facial feature positioning threshold; and graphically modify the first filtered subset of images to perform at least one of: background replacement or graphical filter application, thereby generating a graphically modified first filtered subset of images;

wherein the computer-executable instructions which cause the computing device to select a first selected image from the first set of images comprise computer-executable instructions, which, when executed by the at least some of the one or more processing units, cause the computing device to select the first selected image from the graphically modified first filtered subset of images.

* * * * *